United States Patent [19]
Anderson

[11] Patent Number: 6,031,964
[45] Date of Patent: *Feb. 29, 2000

[54] SYSTEM AND METHOD FOR USING A UNIFIED MEMORY ARCHITECTURE TO IMPLEMENT A DIGITAL CAMERA DEVICE

[75] Inventor: Eric C. Anderson, San Jose, Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/666,241

[22] Filed: Jun. 20, 1996

[51] Int. Cl.⁷ .................................................. H04N 5/225
[52] U.S. Cl. .......................... 386/117; 348/231; 348/552; 348/372
[58] Field of Search ................................. 358/909.1, 906; 386/38, 117; 348/207, 231–233, 552, 372; 395/750.08, 750.01, 677; 711/147, 148; H04N 5/225, 5/76, 5/92

[56] References Cited

U.S. PATENT DOCUMENTS

| | | | |
|---|---|---|---|
| 4,736,224 | 4/1988 | Watanabe et al. | 355/41 |
| 4,739,409 | 4/1988 | Baumeister | 348/244 |
| 5,027,150 | 6/1991 | Inoue et al. | 354/484 |
| 5,057,924 | 10/1991 | Yamada et al. | 358/906 |
| 5,077,582 | 12/1991 | Kravette et al. | 355/206 |
| 5,164,831 | 11/1992 | Kuchta et al. | 358/909.1 |
| 5,231,511 | 7/1993 | Kodama et al. | 358/906 |
| 5,247,321 | 9/1993 | Kazami | 354/106 |
| 5,262,868 | 11/1993 | Kaneko et al. | 358/909.1 |
| 5,359,427 | 10/1994 | Sato | 358/909.1 |
| 5,475,428 | 12/1995 | Hintz et al. | 348/263 |
| 5,475,441 | 12/1995 | Parulski et al. | 348/552 |
| 5,477,264 | 12/1995 | Sarbadhikari et al. | 348/231 |
| 5,486,853 | 1/1996 | Baxter et al. | 358/909.1 |
| 5,493,335 | 2/1996 | Parulski et al. | 348/233 |
| 5,539,535 | 7/1996 | Aizawa et al. | 358/909.1 |
| 5,576,757 | 11/1996 | Roberts et al. | 358/906 |
| 5,631,701 | 5/1997 | Miyake | 358/909.1 |
| 5,640,202 | 6/1997 | Kondo et al. | 358/909.1 |
| 5,867,214 | 2/1999 | Anderson et al. | 348/231 |

OTHER PUBLICATIONS

Martyn Williams, Review–NEC PC–DC401 Digital Still Camera, AppleLink Newbytes, Mar. 15, 1996, pp. 1–3.

*Primary Examiner*—Thai Tran
*Attorney, Agent, or Firm*—Carr & Ferrell LLP; Gregory J. Koerner

[57] ABSTRACT

A system and method for using a unified memory architecture to implement a digital camera device comprises a dynamic random-access memory for storing captured image data during processing and compression, a memory manager routine for allocating storage space within the dynamic random-access memory, a power management system for protecting the stored image data in case of a power failure, and an input/output interface for allowing an external host computer system to access the dynamic random-access memory.

16 Claims, 11 Drawing Sheets

SYSTEM AND METHOD FOR USING A UNIFIED MEMORY ARCHITECTURE TO IMPLEMENT A DIGITAL CAMERA DEVICE

CROSS-REFERENCE TO RELATED APPLICATIONS

This application relates to co-pending U.S. patent application Ser. No. 08/631,173, entitled "Apparatus And Method For Increasing A Digital Camera Image Capture Rate By Delaying Image Processing," filed on Apr. 11, 1996, and to co-pending U.S. patent application Ser. No. 08/633,105, entitled "A System And Method For Managing Utilization Of A Battery," filed on Apr. 16, 1996, which are hereby incorporated by reference.

BACKGROUND OF THE INVENTION

1. Field of the Invention

This invention relates generally to digital cameras and more particularly to a system and method for using a unified memory architecture to implement a digital camera device.

2. Description of the Background Art

Modern digital cameras typically include an imaging device which is controlled by a built-in computer system. The built-in computer system accesses raw image data captured by the imaging device and then processes and compresses the data before storing the compressed data into an internal memory. Efficient operation of the built-in computer is therefore an important consideration for camera designers and manufacturers. The memory architecture of a particular computer system determines data storage techniques and can thus significantly effect the operational efficiency of the entire digital camera system.

In conventional hardware-based digital cameras, the system memory architecture is typically implemented using multiple discrete blocks of memory. The conventional digital camera captures raw image data and then remains unusable until the data is completely processed and stored into internal flash memory. This conventional memory architecture does not readily support the rapid capture of a series of image data sets and is therefore somewhat inconvenient in certain photographic applications.

Furthermore, in modern computer systems, a multi-threading environment effectively allows multiple system processes to run concurrently. The multi-threading environment may thus permit a digital camera to more efficiently process, compress and store image data by performing these functions in the background, when the built-in computer is not busy with more important tasks such as capturing additional sets of image data. A memory architecture which supports the background spooling functions can therefore significantly increase the computer system efficiency. Therefore, an improved system and method is needed for using a unified memory architecture to implement a digital camera device.

SUMMARY OF THE INVENTION

In accordance with the present invention, a system and method are disclosed for using a unified memory architecture to implement a digital camera device. In the preferred embodiment of the present invention, the digital camera includes an imaging device for capturing raw image data and a computer for processing, compressing and storing the image data. The computer includes a dynamic random-access memory (DRAM), a central processing unit (CPU), a memory manager routine stored in read-only memory (ROM), a power management system, an input/output interface (I/O), and an optional removable memory.

The DRAM includes frame buffers for storing raw image data received from the imaging device, a working memory area, and a RAM disk with a standardized file system. In the preferred embodiment, the CPU executes a memory manager routine which selectively allocates storage locations within the DRAM, depending on the requirements of the system and the current image data. The power management system includes a power manager which controls a power supply that is powered by main batteries and which is also connected to backup batteries, in case of a power failure in the main batteries. If the main batteries fail to provide sufficient power for operating the entire digital camera, the power manager maintains operating power to itself, the CPU and the DRAM using the backup batteries.

The DRAM uses a standardized file system which enables an external host computer system to readily access image data stored in the DRAM via the digital camera's I/O interface. The nonvolatile removable memory serves as a storage area for additional image data. A camera user who possesses several removable memories may thus replace a full removable memory with an empty removable memory to effectively expand the picture-taking capacity of the digital camera. The present invention therefore improves the performance and efficiency of a digital camera device through the use of an improved unified memory architecture.

DETAILED DESCRIPTION OF THE PREFERRED EMBODIMENT

The present invention discloses a system and method for using a unified memory architecture to implement a digital camera device and comprises a unified memory device for storing sets of image data and a central processing unit for executing a memory manager routine which allocates storage locations within the memory device to store the sets of image data. The present invention also includes a power management system for protecting the sets of image data in the event of a power failure to the digital camera device and an input/output interface whereby an external host computer can access the sets of image data stored in the memory device.

Figure 1:
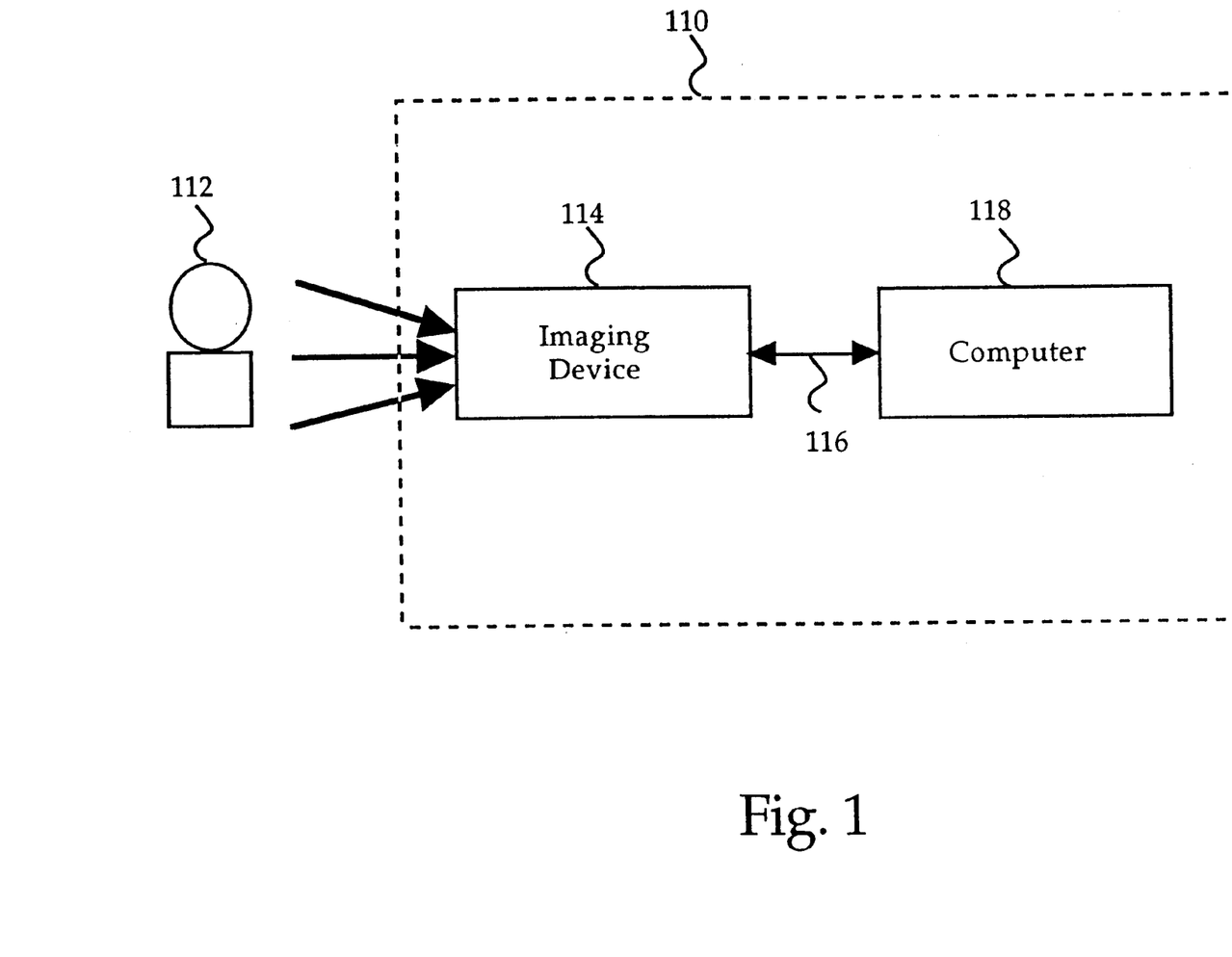
FIG. 1 is a block diagram of a digital camera according to the present invention.

Referring now to FIG. 1, a block diagram of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
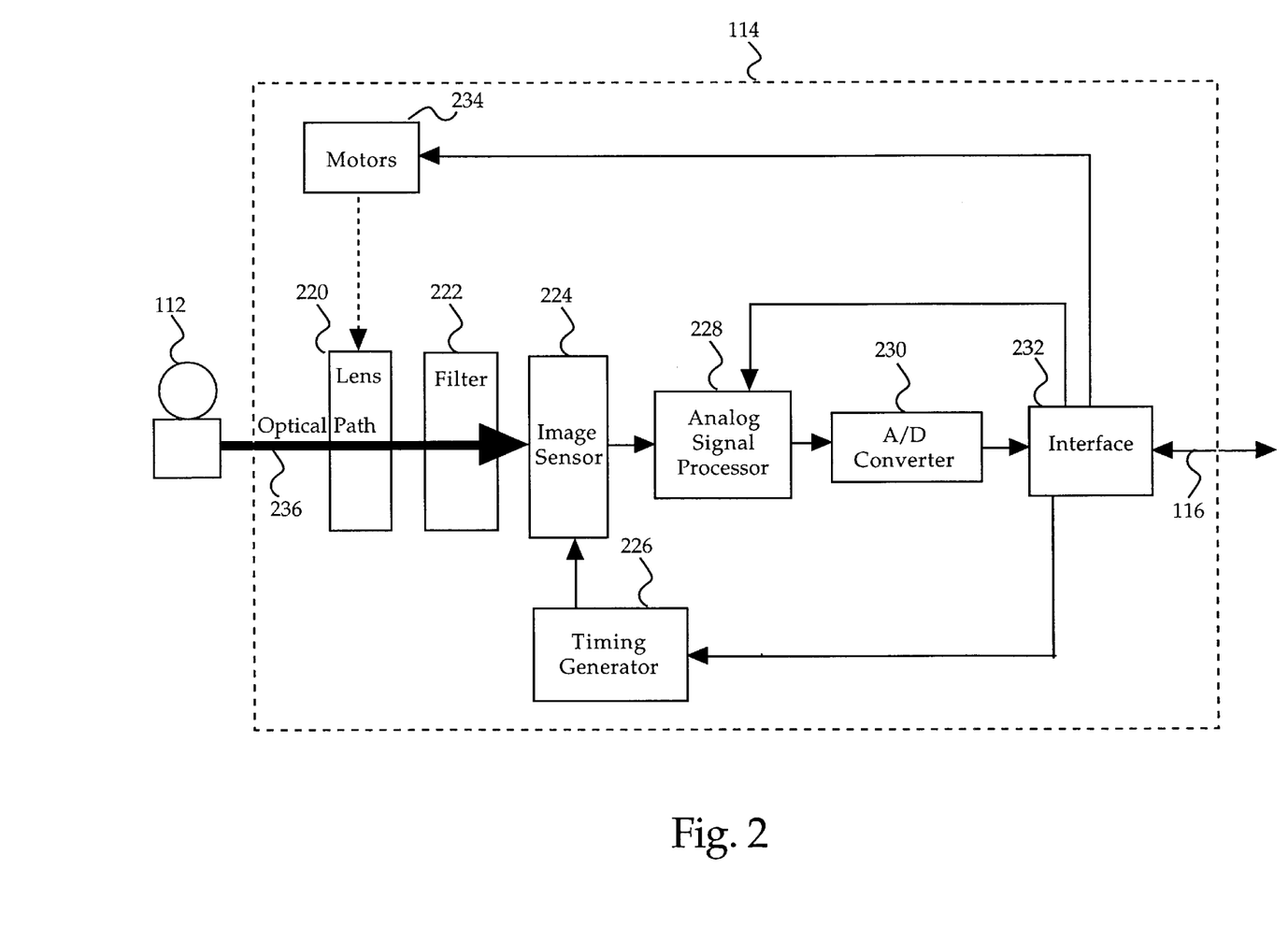
FIG. 2 is a block diagram of the preferred embodiment for the imaging device of FIG. 1.

Referring now to FIG. 2, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

U.S. patent application Ser. No. 08/355,031, entitled "A System and Method For Generating a Contrast Overlay as a Focus Assist for an Imaging Device," filed on Dec. 13, 1994 is incorporated herein by reference and provides a detailed discussion of the preferred elements of imaging device 114. Briefly, imaging device 114 captures an image of object 112 via reflected light impacting image sensor 224 along optical path 236. Image sensor 224 responsively generates a set of raw image data representing the captured image 112. The raw image data is then routed through ASP 228, AID converter 230 and interface 232. Interface 232 has outputs for controlling ASP 228, motors 234 and timing generator 226. From interface 232, the raw image data passes over system bus 116 to computer 118.

Figure 3:
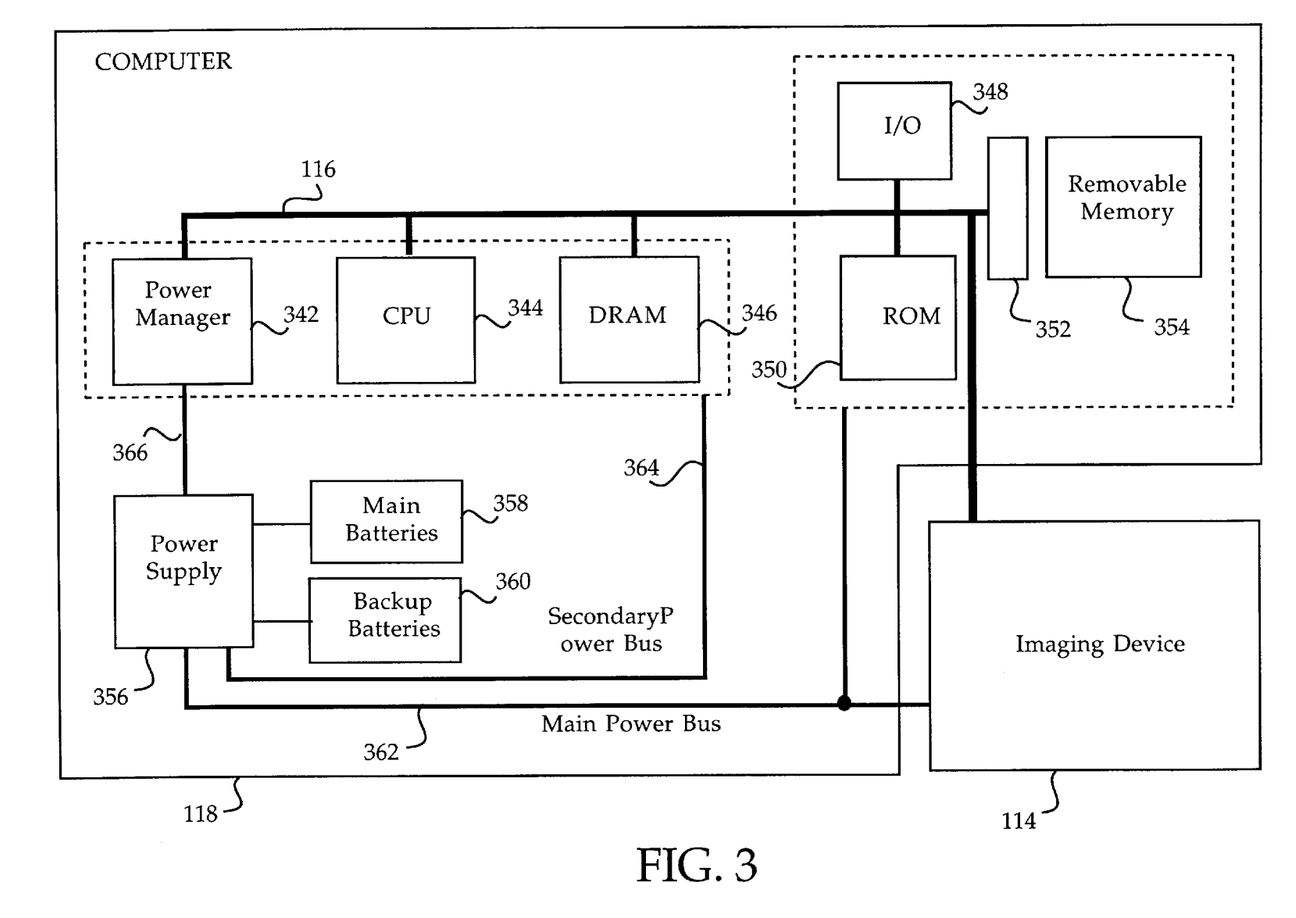
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110 as discussed below in conjunction with FIGS. 7–10. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions and is further discussed below in conjunction with FIGS. 4–11.

I/O 348 is an interface device allowing communications to and from computer 118. For example, I/O 348 permits an external host computer (not shown) to connect to and communicate with computer 118. I/O 348 also permits a camera 110 user to communicate with camera 110 via a set of externally-mounted user controls and via an external LCD display panel. ROM 350 typically comprises a conventional nonvolatile read-only memory which stores a set of computer-readable program instructions to control the operation of camera 110. ROM 350 is further discussed below in conjunction with FIG. 4. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) are thus protected against a power failure in main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs. The operation of power manager 342 and power supply 356 are further discussed below in conjunction with FIGS. 7–10.

Figure 4:
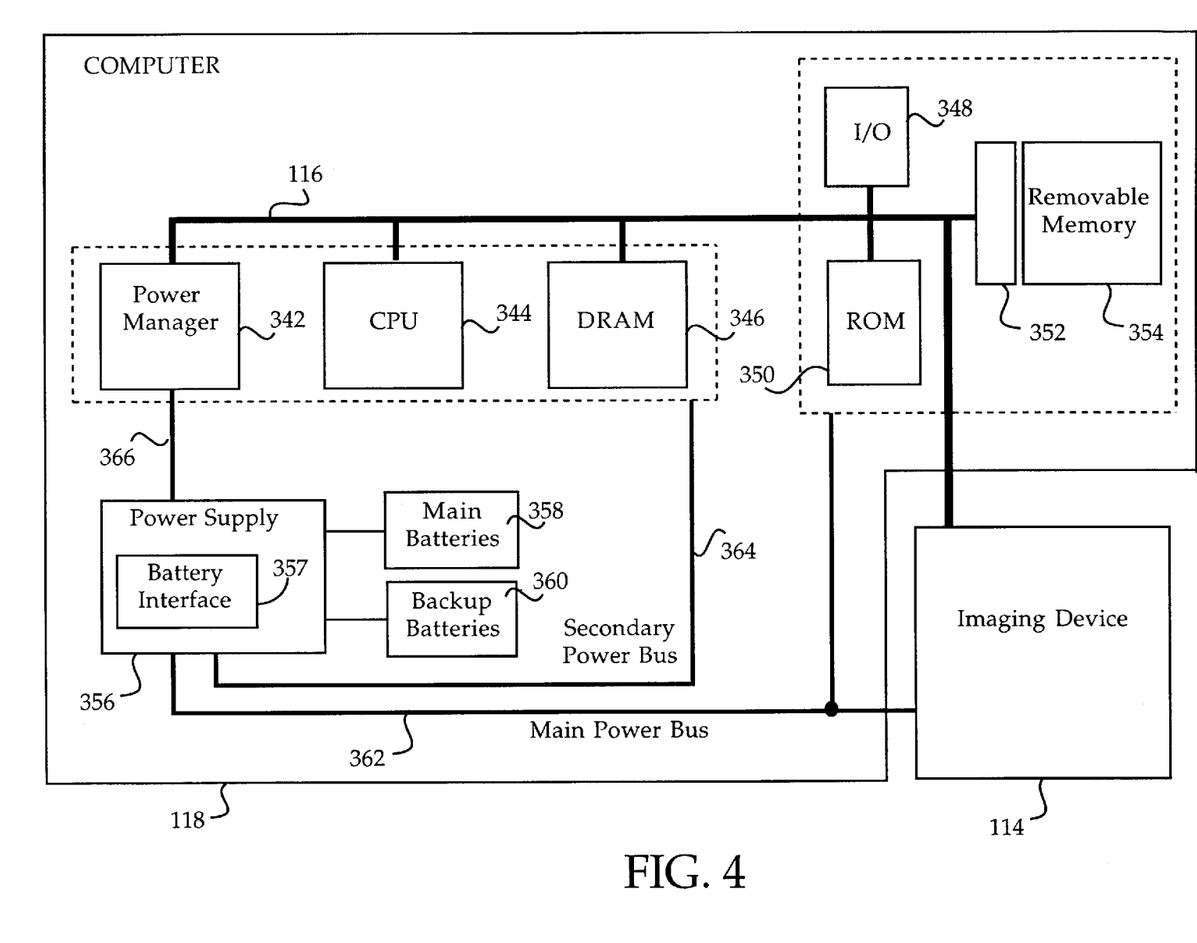
FIG. 4 is a memory map showing the preferred embodiment of the Read-Only-Memory (ROM) of FIG. 3.

Referring now to FIG. 4, a memory map showing the preferred embodiment of Read-Only-Memory (ROM) 350 is shown. In the preferred embodiment, ROM 350 includes control application 400, toolbox 402, drivers 404, kernel 406 and system configuration 408. Control application 400 comprises program instructions for controlling and coordinating the various functions of camera 110. Toolbox 402 contains selected function modules including memory manager 410, RAM spooler 1 (412), RAM spooler 2 (414), removable memory spooler 1 (416), removable memory spooler 2 (418), image processing and compression (IPC) 420 and file system 422.

Memory manager 410 is controlled by control application 400 and responsively allocates DRAM 346 storage locations depending upon the needs of computer 118 and the sets of received image data. File system 422 controls the file structure used in storing data onto DRAM 346. In the preferred embodiment, DRAM 346 uses a standardized file system 422 which permits an external host computer system to readily recognize and directly access DRAM 346 via I/O 348.

RAM spooler 1 (412), RAM spooler 2 (414), removable memory spooler 1 (416), removable memory spooler 2 (418), and image processing/compression (IPC) 420 are software routines used to spool, process, compress and store captured image data according to the present invention. These aforementioned software routines 412 through 420 are further discussed below in conjunction with FIG. 6.

Drivers 404 control various hardware devices within camera 110 (for example, motors 234). Kernel 406 provides basic underlying services for the camera 110 operating system. System configuration 408 performs initial start-up routines for camera 110, including the boot routine and initial system diagnostics.

Figure 5:
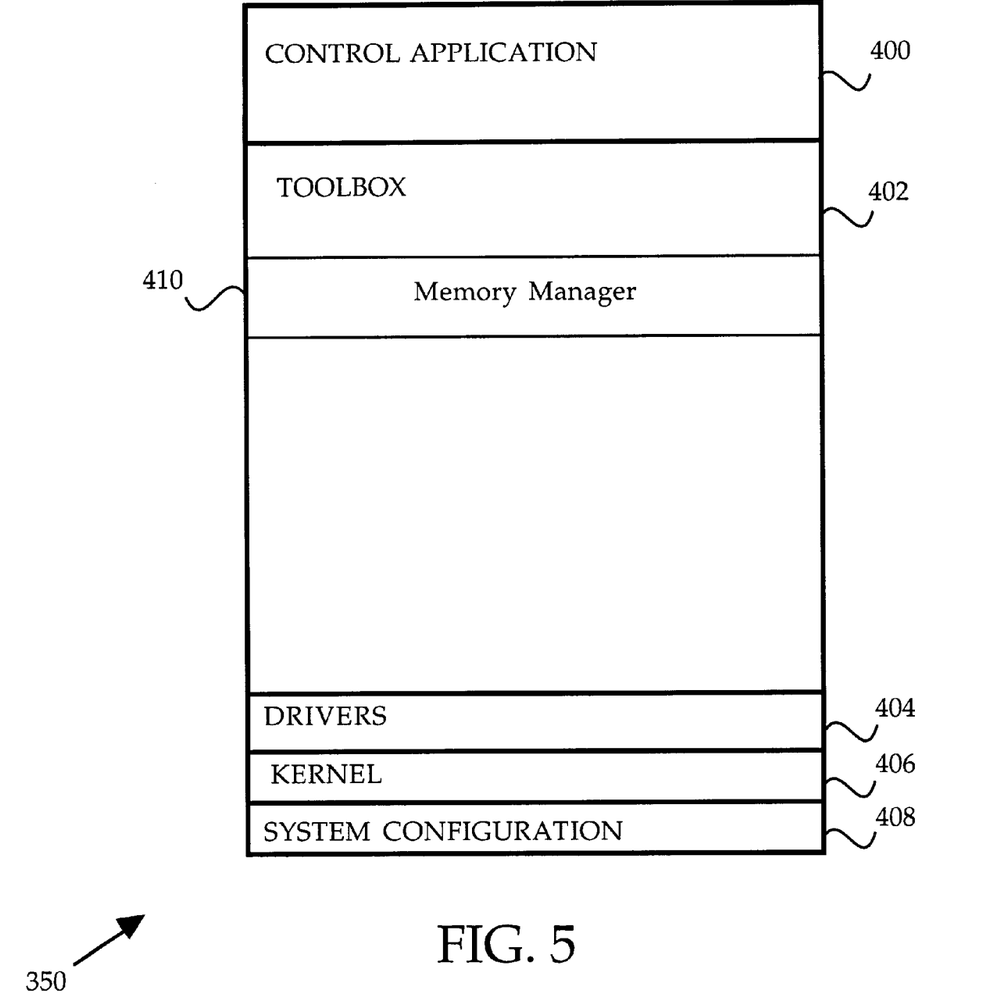
FIG. 5 is a memory map showing the preferred embodiment of the Dynamic Random-Access-Memory (DRAM) of FIG. 3.

Referring now to FIG. 5, a memory map showing the preferred embodiment of dynamic random-access-memory (DRAM) 346 is shown. In the preferred embodiment, DRAM 346 includes working memory 530, RAM disk 532 and system area 534. Working memory 530 includes frame buffers 536 (for initially storing sets of raw image data received from imaging device 114) and image processing (IP) buffers 538 (for temporarily storing image data during the image processing and compression 420 process). Working memory 530 may also contain various stacks, data structures and variables used by CPU 344 while executing the software routines used within computer 118.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Figure 6:
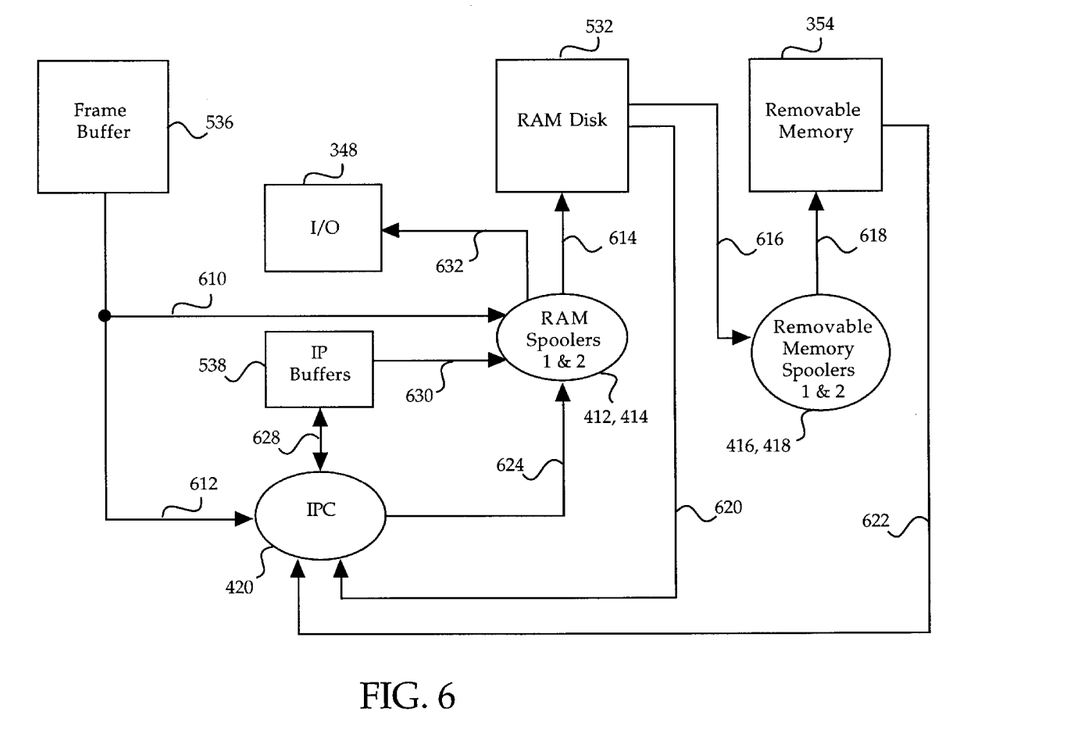
FIG. 6 is a block diagram showing preferred data paths for transmitting image data between components of the FIG. 3 computer.

Referring now to FIG. 6, a block diagram showing preferred data paths for transmitting image data between selected computer 118 components is shown. In FIG. 6, frame buffer 536 receives and stores raw image data previously captured by imaging device 114. Frame buffer 536 then transfers control of the raw image data to RAM spooler 1 (412) via line 610. Alternately, if RAM disk 532 is full, frame buffer 536 may transfer control of the raw image data directly to image processing/compression (IPC) 420 using line 612. If RAM spooler 1 (412) receives control of the raw image data, it then stores the raw image data into RAM disk 532 using line 614.

Removable memory spooler 1 (416) may then access the raw image data from RAM disk 532 via line 616 and store it into removable memory 354 using line 618. Alternately, if removable memory 354 is full or is not inserted, RAM disk 532 may provide the raw image data directly to IPC 420 using line 620. If removable memory spooler 1 (416) stores the raw image data into removable memory 354, then IPC 420 typically accesses the stored raw image data using line 622 and processes the raw data to obtain compressed image data.

IPC 420 may provide the compressed image data to RAM spooler 2 (414) using line 624. If RAM disk 532 is temporarily full, IPC 420 may write the compressed data to temporary IP buffers 538 via line 628. RAM spooler 2 (414) may then access the compressed image data via line 630 and write the accessed data into RAM disk 532 via line 614. RAM spooler 2 (414) may also download the compressed image data to I/O interface 348 using line 632. Once the compressed data is in RAM disk 532, removable memory spooler 2 (418) then accesses the data via line 616 and writes the compressed data into removable memory 354 using line 618. If removable memory 354 is not inserted, the compressed data remains on RAM disk 532.

The present invention may thus process and store a sequence of captured images received from imaging device 114. Although the above example traces the typical data path for a single captured image, the present invention may readily operate on a plurality of captured images progressing through various parts of computer 118 and therefore, multiple sets of image data may exist simultaneously within computer 118.

Figure 7:
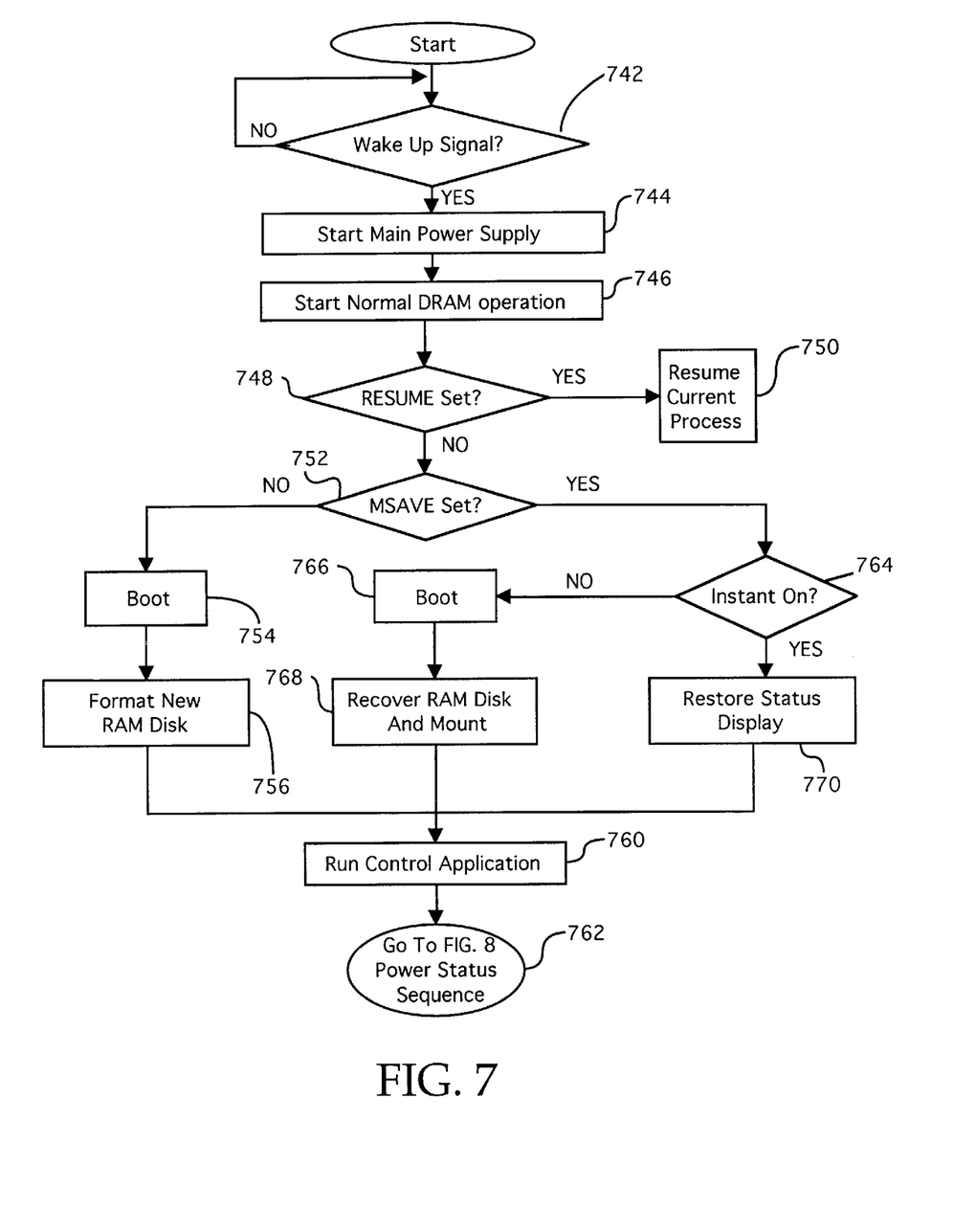
FIG. 7 is a flowchart of preferred method steps for performing a power-up sequence according to the present invention.

Referring now to FIG. 7, a flowchart of preferred method steps for performing a power-up sequence according to the present invention is shown. Initially, computer 118 waits 742 for a "wake up" signal which is typically generated in response to the activation of a camera 110 power on-off switch. After the "wake up" signal is generated, power manager 342 starts 744 power supply 356 in normal mode with the main batteries 358 providing operating power to power supply 356 which then responsively provides the operating power to main power bus 362 and also to secondary power bus 364. If available operating power is insufficient, the startup process aborts.

CPU 344 then starts 746 normal DRAM 346 operation and determines 748 whether a RESUME bit has been set in power manager 342. In the preferred embodiment, CPU 344 sets the RESUME bit in response to a power failure in order to indicate that CPU 344 should not be reset in a subsequent powerup of camera 110. If the RESUME bit has been set, CPU 344 resumes 750 the current process which was interrupted by the intervening power failure.

If the RESUME bit has not been set, CPU 344 then determines 752 whether a MSAVE bit has been set in power manager 342. In the preferred embodiment, CPU 344 sets the MSAVE bit to specify that RAM disk 532 contains image data that should be saved upon restart of computer 118. If the MSAVE bit has not been set, computer 118 boots up 754 using the system configuration 408 routine and formats 756 a new RAM disk 532. CPU 344 then runs 760 control application 400 for normal operation of camera 110.

In step 752, if the MSAVE bit has been set, then CPU 344 determines 764 whether the "instant on" feature is selected. The "instant on" feature provides a more rapid restart procedure, however, since the system is not initialized by a new bootup procedure, new system configuration files will not be accessed. If "instant on" is selected, CPU 344 restores 770 the externally-mounted LCD status display and runs 760 control application 400. If "instant on" is not selected, computer 118 boots up 766 using the system configuration 408 routine and then recovers and mounts 768 RAM disk 532. CPU 344 then runs 760 control application 400 for normal operation of camera 110. The FIG. 7 process then goes 762 to the power status sequence of FIG. 8.

Figure 8:
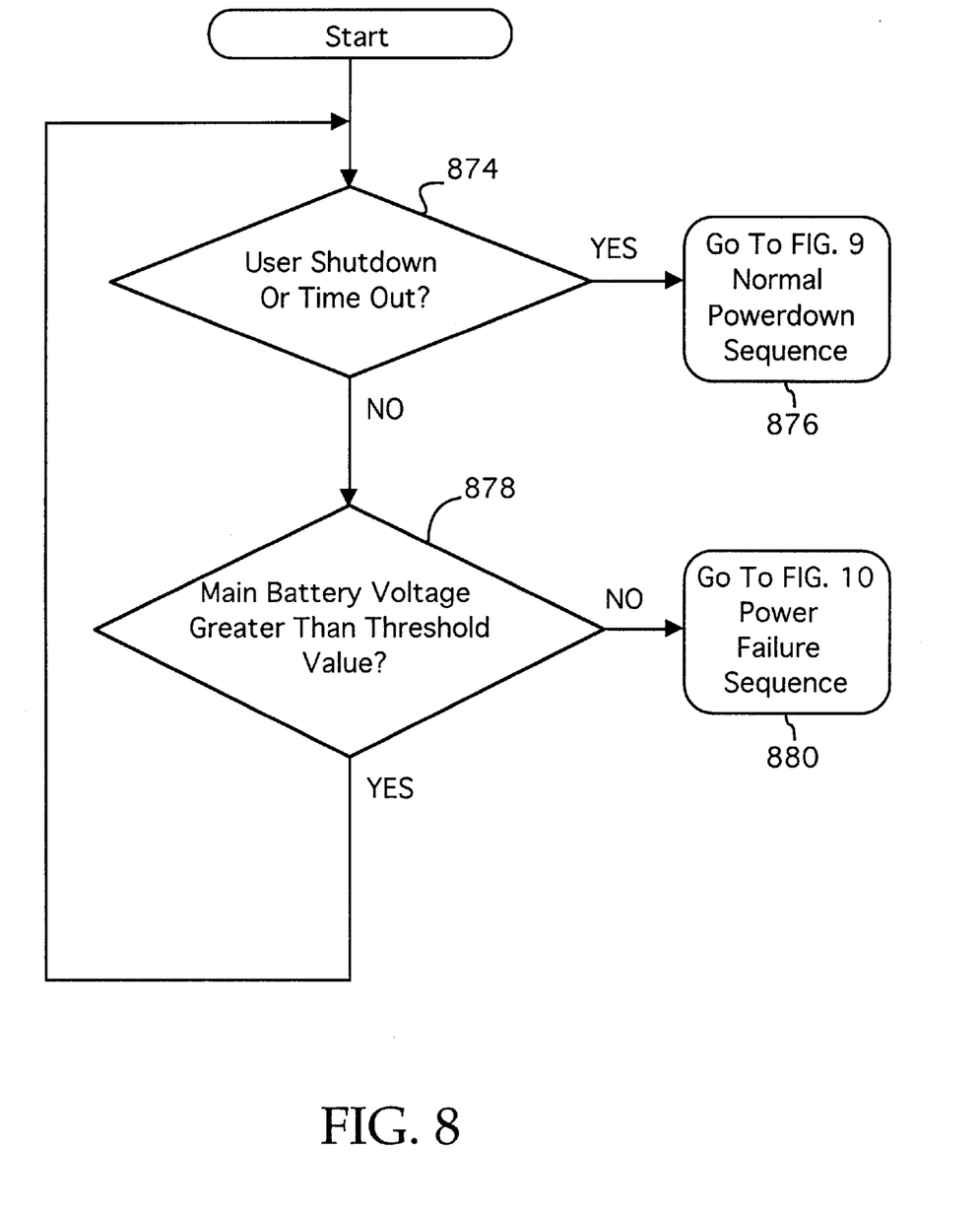
FIG. 8 is a flowchart of preferred method steps for performing a power status sequence according to the present invention.

Referring now to FIG. 8, a flowchart of preferred method steps for performing a power status sequence according to the present invention is shown. Initially, CPU 344 determines 874 whether a user shutdown or a time out event has occurred. A user shutdown results from the deactivation of the camera 110 power on-off switch by a user. A time out event powers down camera 110 in response to an extended period of non-use and is intended to prevent a user from accidentally leaving camera 110 powered up and thereby unnecessarily draining power from the main batteries 358.

Figure 9:
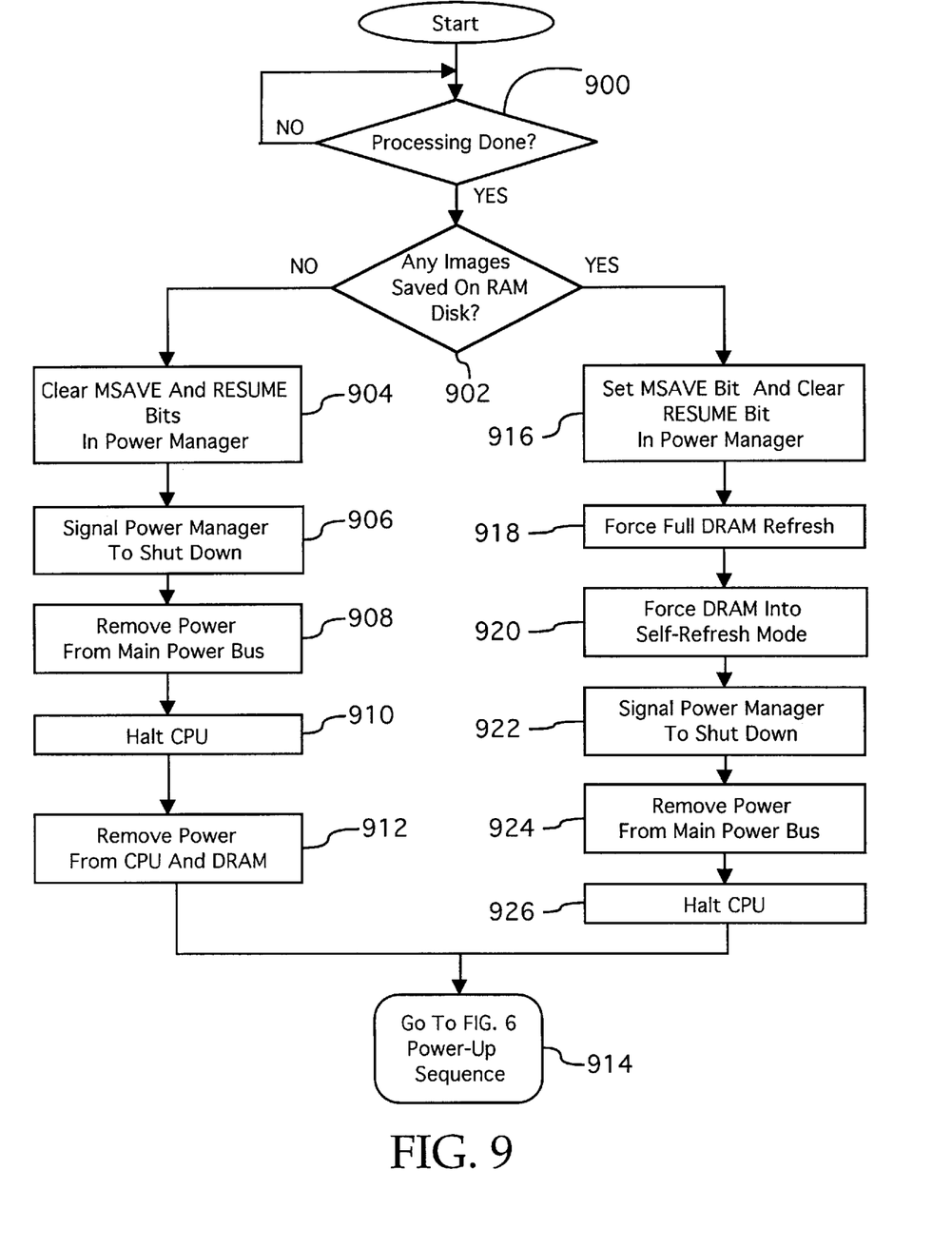
FIG. 9 is a flowchart of preferred method steps for performing a normal power-down sequence according to the present invention.

If CPU 344 detects 874 a user shutdown or a time out event, then the FIG. 8 process goes 876 to the normal power down sequence of FIG. 9. If CPU 344 does not detect 874 a user shutdown or a time out event, then power manager 342 determines 878 whether the voltage of the main batteries 358 is greater than a selected threshold value. The threshold value may be selected as a minimum camera 110 operating voltage, or alternately may be incrementally higher that the minimum operating voltage. If the voltage of the main batteries 358 is not greater than the selected threshold value, then the FIG. 8 process goes 880 to the power failure sequence of FIG. 10. However, if the voltage of the main batteries 358 is greater than the selected threshold value, then the FIG. 8 process returns to step 874 and CPU 344 checks again for a user shutdown or a time out event.

Referring now to FIG. 9, a flowchart of preferred method steps for performing a normal power-down sequence according to the present invention is shown. Initially, CPU 344 waits 900 until processing of any image data is completed and then determines 902 whether any images are saved on RAM disk 532. If no images are saved on RAM disk 532, then CPU 344 clears 904 the MSAVE and RESUME bits in power manager 342. CPU 344 then signals 906 power manager 342 to shut down and power manager 342 responsively directs power supply 356 to remove 908 power from the main power bus 362. Next, CPU 344 halts 910 its operation and power manager 342 removes 912 power from CPU 344 and DRAM 346. The FIG. 9 process then goes 914 to the power up sequence of FIG. 6.

If CPU 344 determines, in step 902, that images are saved on RAM disk 532, then CPU 344 sets the MSAVE bit and clears 916 the RESUME bit in power manager 342. Next, CPU 344 forces 918 a full refresh of DRAM 346 and then forces 920 DRAM 346 into a self-refresh mode. CPU 344 then signals 922 power manager 342 to shut down and power manager 342 responsively directs power supply 356 to remove 924 power from the main power bus 362. Next, CPU 344 halts 926 its operation. The FIG. 9 process then goes 914 to the power up sequence of FIG. 6.

Figure 10:
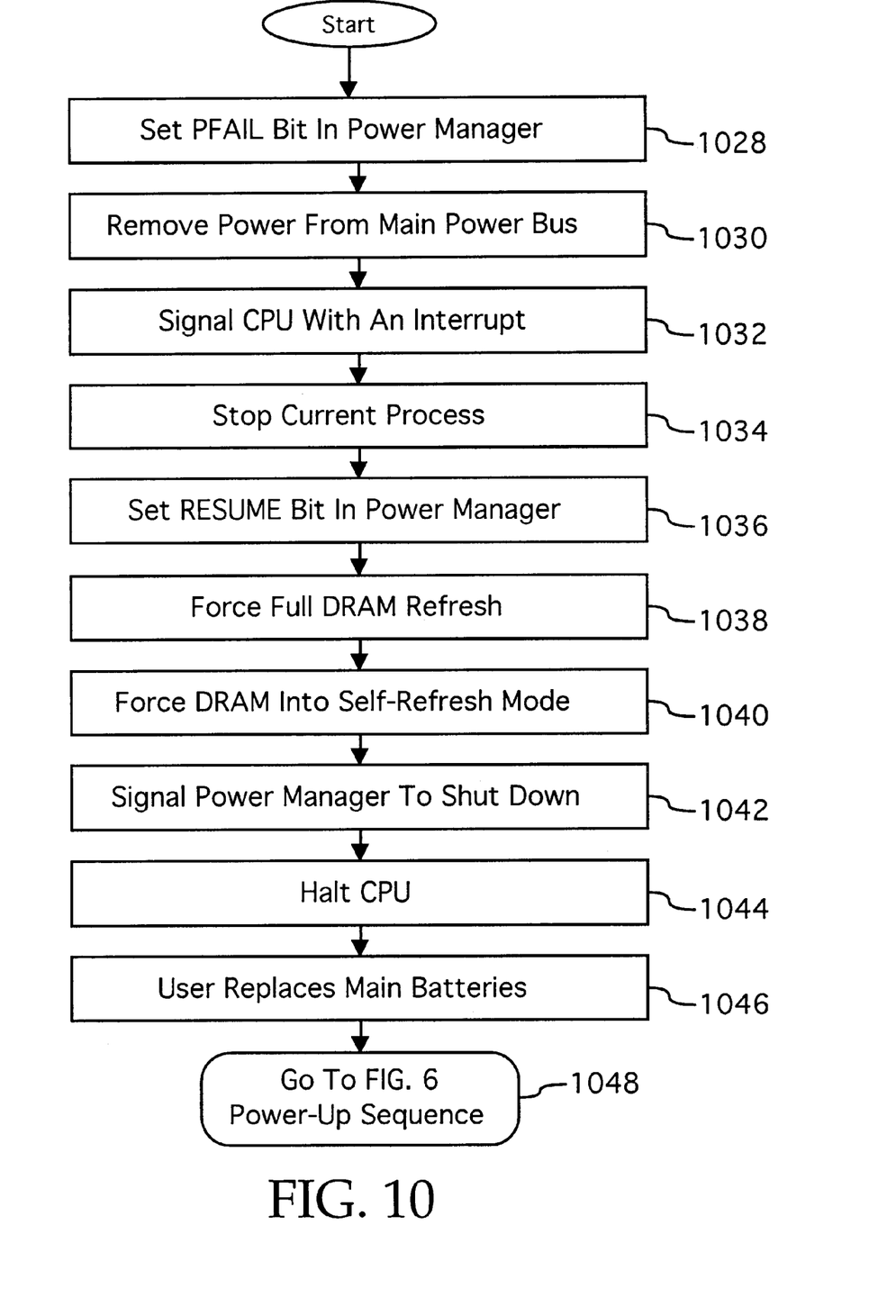
FIG. 10 is a flowchart of preferred method steps for performing a power failure sequence according to the present invention.

Referring now to FIG. 10, a flowchart of preferred method steps for performing a power failure sequence according to the present invention is shown. Initially, power manager 342 sets 1028 its PFAIL bit. The PFAIL bit records the occurrence of a power failure so that computer 118 software routines may subsequently access this information when needed. Next, power manager 342 responsively directs power supply 356 to remove 1030 power from the main power bus 362. Power manager 342 then signals 1032 CPU 344 with an interrupt and CPU 344 responsively stops 1034 the current process.

Next, CPU 344 sets 1036 the RESUME bit in power manager 342. CPU 344 then forces 1038 a full refresh of DRAM 346 and then forces 1040 DRAM 346 into a self-refresh mode. Next, CPU 344 signals 1042 power manager 342 to shut down and halts 1044 its operation. The camera 110 user may then replace 1046 the main batteries 358 and the FIG. 10 process goes 1048 to the power up sequence of FIG. 6.

Figure 11:
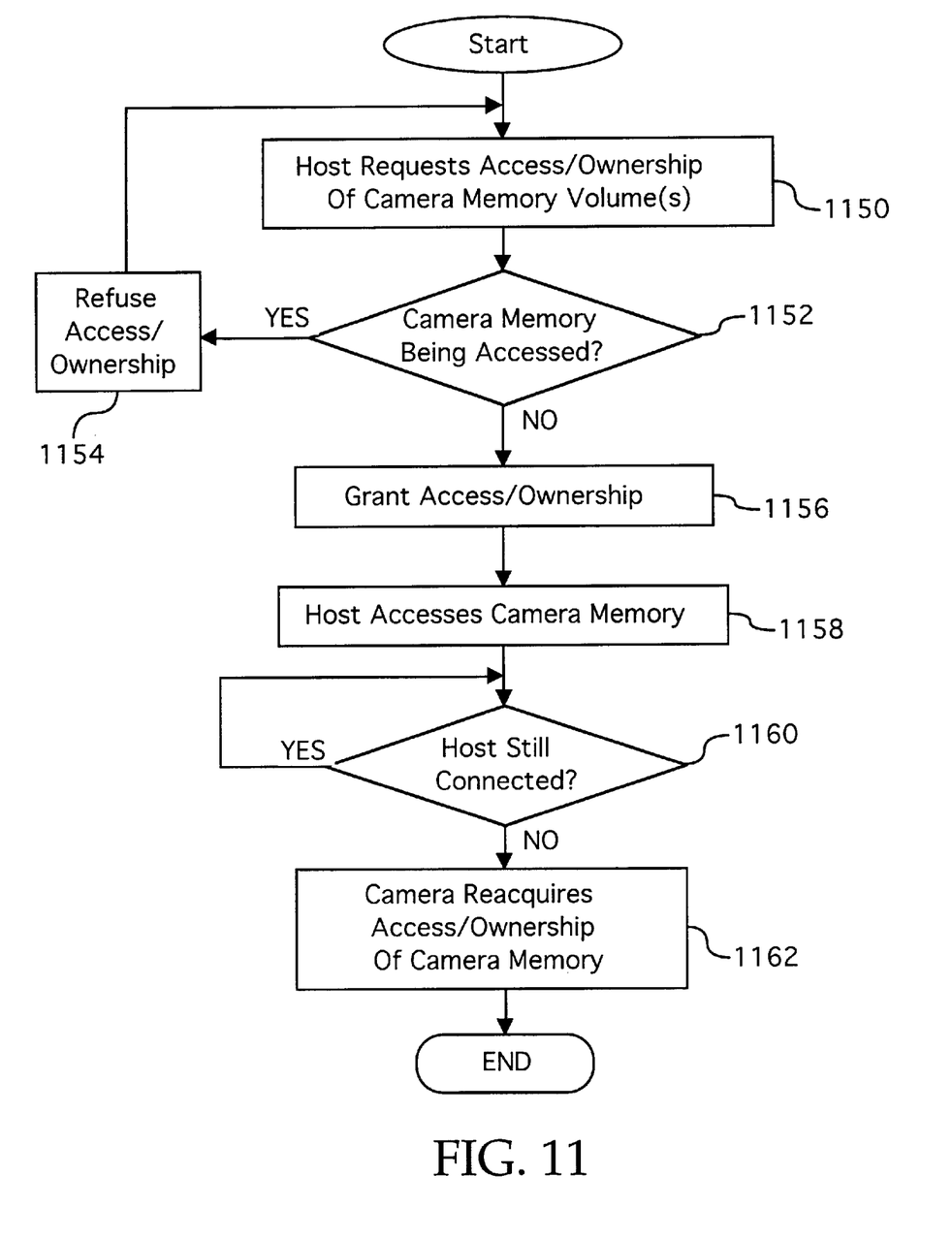
FIG. 11 is a flowchart of preferred method steps for a host computer system to access the camera memory of FIG. 3.

Referring now to FIG. 11, a flowchart of preferred method steps for accessing DRAM 346 and/or removable disk 354 with an external host computer is shown. Initially, the external host computer requests 1150 access/ownership of one or more volumes stored on DRAM 346 and/or removable disk 354. CPU 344 then determines 1152 whether DRAM 346 and/or removable disk 354 are currently being accessed. If DRAM 346 and/or removable disk 354 are currently being accessed, then CPU 344 refuses 1154 access/ownership of DRAM 346 and/or removable disk 354 to the external host computer.

However, if DRAM 346 and/or removable disk 354 are not currently being accessed, then CPU 344 grants 1156 access/ownership of DRAM 346 and/or removable disk 354 to the external host computer. The host computer then accesses 1158 DRAM 346 and/or removable disk 354. Next, CPU 344 determines 1160 whether the host computer is still connected to DRAM 346 and/or removable disk 354. If the host computer is still connected to DRAM 346 and/or removable disk 354, then CPU 344 waits until the host computer is no longer connected to DRAM 346 and/or removable disk 354 and then reacquires 1162 access/ownership of DRAM 346 and/or removable disk 354 for camera 110.

The invention has been explained above with reference to a preferred embodiment. Other embodiments will be apparent to those skilled in the art in light of this disclosure. For example, DRAM 346 may alternately store various types of information other than those described above in conjunction with the preferred embodiment. Further, the present invention may alternately provide backup power protection to various computer 118 components other than those described in the prior discussion of the preferred embodiment. Therefore, these and other variations upon the preferred embodiment are intended to be covered by the present invention, which is limited only by the appended claims.

What is claimed is:

1. A digital camera device comprising:
    a CPU capable of concurrently processing multiple unprocessed images into processed images;
    a memory device, coupled to said CPU, for storing sets of image data, comprising frame buffers for storing unprocessed image data and a random-access memory disk for storing unprocessed image data and processed image data;
    a memory manager for allocating storage locations to store said sets of image data within said memory device;
    a power management system, for monitoring a power supply to detect a power failure, configured to protect said sets of image data if said power failure is detected; and
    an interface coupled to said memory device whereby an external host computer can access said sets of image data stored in said memory device.

2. The digital camera device of claim 1 further comprising a removable non-volatile memory coupled to said memory device for storing unprocessed image data and processed image data.

3. The digital camera device of claim 1 wherein said memory device uses a standardized file system for storing said sets of image data.

4. The digital camera device of claim 1 wherein said power management system comprises:
    main batteries for providing operating power to said digital camera during normal operation;
    backup batteries for providing operating power to said memory device during a power failure in said main batteries; and a power manager device for sensing said power failure and responsively connecting said memory device to said backup batteries.

5. A method of implementing a digital camera device, comprising the steps of:

using a CPU to concurrently process multiple unprocessed images into processed images;

using a memory manager to allocate storage locations within a memory device comprising frame buffers for storing unprocessed image data and a random-access memory disk for storing unprocessed image data and processed image data;

storing sets of image data into said allocated storage locations;

using a power management system to monitor a power supply and detect a power failure;

using said power management system to protect said sets of image data from said power failure; and communicating with said memory device via an interface whereby an external host computer can access said sets of image data.

6. The method of claim 5 further comprising a removable non-volatile memory coupled to said memory device for storing unprocessed image data and processed image data.

7. The method of claim 5 wherein said memory device uses a standardized file system for storing said sets of image data.

8. The method of claim 5 wherein said CPU can instruct said memory manager to allocate said storage locations.

9. A computer-readable medium comprising program instructions for causing a computer system to perform the steps of:

using a CPU to concurrently process multiple unprocessed images into processed images;

using a memory manager to allocate storage locations within a memory device comprising frame buffers for storing unprocessed image data and a random-access memory disk for storing unprocessed image data and processed image data;

storing sets of image data into said allocated storage locations;

using a power management system to monitor a power supply and detect a power failure;

using said power management system to protect said sets of image data from said power failure; and communicating with said memory device via an interface whereby an external host computer can access said sets of image data.

10. The medium of claim 9 further comprising a removable non-volatile memory coupled to said memory device for storing unprocessed image data and processed image data.

11. The medium of claim 9 wherein said memory device uses a standardized file system for storing said sets of image data.

12. The medium of claim 9 wherein said CPU can instruct said memory manager to allocate said storage locations.

13. A digital camera device comprising:

CPU means for concurrently processing multiple unprocessed images into processed images;

memory manager means for allocating storage locations within a memory device comprising frame buffers for storing unprocessed image data and a random-access memory disk for storing unprocessed image data and processed image data;

means for storing sets of image data into said allocated storage locations; and means for communicating with said memory device via an interface whereby an external host computer can access said sets of image data.

14. The digital camera device of claim 13 further comprising a removable non-volatile memory coupled to said memory device to store unprocessed image data and processed image data.

15. The digital camera device of claim 13 wherein said memory device uses a standardized file system for storing said sets of image data.

16. The digital camera device of claim 13 wherein said CPU can instruct said memory manager to allocate said storage locations.

* * * * *